US011252580B2

(12) United States Patent
Kunert et al.

(10) Patent No.: US 11,252,580 B2
(45) Date of Patent: Feb. 15, 2022

(54) MOBILE RADIO COMMUNICATION WITH IMPROVED TRANSMISSION AND RECEPTION QUALITY

(71) Applicant: INSTITUT FUR RUNDFUNKTECHNIK GMBH, Munich (DE)

(72) Inventors: Clemens Kunert, Unterfoehring (DE); Ralph Peter Zahnder, Munich (DE); Hermann Lipfert, Oberhaching (DE); Swen Petersen, Munich (DE)

(73) Assignee: Institut Fur Rundfunktechnik GMBH, Munich (DE)

( * ) Notice: Subject to any disclaimer, the term of this patent is extended or adjusted under 35 U.S.C. 154(b) by 43 days.

(21) Appl. No.: 16/307,436

(22) PCT Filed: Jul. 12, 2017

(86) PCT No.: PCT/EP2017/067599
§ 371 (c)(1),
(2) Date: Dec. 5, 2018

(87) PCT Pub. No.: WO2018/011293
PCT Pub. Date: Jan. 18, 2018

(65) Prior Publication Data
US 2019/0349778 A1    Nov. 14, 2019

(30) Foreign Application Priority Data
Jul. 12, 2016    (IT) .................. 102016000072521

(51) Int. Cl.
*H04W 16/26*    (2009.01)
*H04W 4/24*    (2018.01)
(Continued)

(52) U.S. Cl.
CPC ............. *H04W 16/26* (2013.01); *H04W 4/24* (2013.01); *H04W 8/20* (2013.01); *H04W 24/02* (2013.01);
(Continued)

(58) Field of Classification Search
CPC ......... H04W 16/26; H04W 4/24; H04W 8/20; H04W 24/02; H04W 24/08; H04W 88/04; H04W 92/10; H04W 92/18
See application file for complete search history.

(56) References Cited

U.S. PATENT DOCUMENTS

| 2003/0050041 A1* | 3/2003 | Wu | H04L 12/14 |
| | | | 455/406 |
| 2008/0177749 A1* | 7/2008 | Overton | H04W 4/029 |

(Continued)

FOREIGN PATENT DOCUMENTS

| KR | 20140118118 A | * 10/2014 | |
| KR | 20140118118 A | 10/2014 | |
| WO | WO-2007021115 A1 | * 2/2007 | ........... G06F 1/3228 |

OTHER PUBLICATIONS

International Search Report and Written Opinion dated Oct. 30, 2017, issued in PCT Application No. PCT/EP2017/067599 filed Jul. 12, 2017.

*Primary Examiner* — Michael Thier
*Assistant Examiner* — Nevena Zecevic Sandhu
(74) *Attorney, Agent, or Firm* — Workman Nydegger

(57) ABSTRACT

A mobile radio device, a base station, a transmitter network, a method, a software module, and a server for improving transmission and/or reception quality, wherein, according to a main aspect, a mobile radio device is proposed for communication in a mobile radio network, wherein the mobile radio device is configured such as to operate in a mobile radio network and to communicate by way of mobile radio signals which are allocated to the mobile radio device, (Continued)

wherein the mobile radio device is further configured in order, as a function of a test result, to amplify mobile radio signals between a base station and at least one further mobile radio device, in order to improve reception quality and/or transmission quality of the mobile radio signals.

20 Claims, 5 Drawing Sheets

(51) Int. Cl.
| | |
|---|---|
| *H04W 8/20* | (2009.01) |
| *H04W 24/02* | (2009.01) |
| *H04W 24/08* | (2009.01) |
| *H04W 88/04* | (2009.01) |
| *H04W 92/10* | (2009.01) |
| *H04W 92/18* | (2009.01) |

(52) U.S. Cl.
CPC ........... *H04W 24/08* (2013.01); *H04W 88/04* (2013.01); *H04W 92/10* (2013.01); *H04W 92/18* (2013.01)

(56) References Cited

U.S. PATENT DOCUMENTS

| | | | |
|---|---|---|---|
| 2012/0108165 A1* | 5/2012 | Sawamoto | H04B 7/15535 455/11.1 |
| 2012/0252525 A1* | 10/2012 | Frenger | H04W 52/04 455/524 |
| 2013/0183975 A1* | 7/2013 | Hyun | H04W 36/22 455/436 |
| 2013/0281167 A1* | 10/2013 | Cho | H04B 17/12 455/571 |
| 2014/0198672 A1* | 7/2014 | Koo | H04W 72/1215 370/252 |
| 2015/0005026 A1* | 1/2015 | Wild | H04W 48/02 455/522 |
| 2015/0119018 A1* | 4/2015 | Yang | H04W 8/20 455/419 |
| 2015/0230114 A1 | 8/2015 | Delsol et al. | |
| 2017/0180033 A1* | 6/2017 | Tobin | H04W 40/22 |
| 2017/0302689 A1* | 10/2017 | Jiang | H04L 63/1441 |
| 2018/0035354 A1* | 2/2018 | Martin | H04W 40/22 |

* cited by examiner

MOBILE RADIO COMMUNICATION WITH IMPROVED TRANSMISSION AND RECEPTION QUALITY

BACKGROUND OF THE INVENTION

1. The Field of the Invention

The present invention relates to a mobile radio device, a base station, a transmitter network, a method, a software module, and a server, for improving transmission and/or reception quality.

2. The Relevant Technology

It is known that in mobile radio communications information signals are exchanged between a base station and a mobile radio device, wherein an information signal is a telephone call signal, a data signal, audio signal, video signal, and/or a signal disseminated via the Internet. The foresaid variants of information signals, and also other conceivable signals which are exchanged between the mobile radio subscribers are addressed in the present Application. It is additionally pointed out that the expression "subscribers" is understood to mean the communication partners as well as the technical components, such as servers or base stations. In this situation, the information signals are exchanged via an air interface between the mobile radio subscribers, such as transmitters, receivers, or a base station in a mobile radio network. It is also known that in many situations mobile radio devices do not have an adequate transmission and/or reception quality in order to exchange information signals with other subscribers in the mobile radio network. The inadequate transmission and/or reception quality is in most cases incurred by a weak transmission and/or reception signal, signal interference, and/or obstructions on the transfer interval distance, which cause a screening and/or unfavourable reflection of the information signals. Such screening or interference can be caused, for example, by walls or windows of a building.

In order to improve the transmission and/or reception quality, what are referred to as repeaters are known from the prior art, which receive an information signal and, after amplification, retransmit it. The use of conventional commercial repeaters according to the prior art requires as a precondition in the first instance that network type compatibility must be guaranteed, with the result that not every repeater can be used for any desired network type, such as for GSM, 2G, 3G, 4G, 5G or higher. Moreover, the repeater must be specially preconfigured for each receiver. Moreover, the repeater is permanently mounted or installed at a predetermined location, such that the repeater function can only come into application in a predefined local area, and is restricted only to this area. The repeater in question must also be supplied separately with electrical energy, with the result that flexible placement and use is not possible, on the one hand due to the spatial commitment and, on the other, due to the absence of an energy supply. It is also to be mentioned that the presence of a poor transmission and/or reception quality cannot always be foreseen, with the result that these either remain undetected for certain areas or only temporarily occur. Accordingly, a conventional commercial repeater cannot be used in such cases. Additionally, the procurement of a conventional commercial repeater represents a disadvantage from the economic point of view, since the use of a repeater is associated with substantial costs. Accordingly, the conventional commercial repeater is associated with many restrictions and disadvantages from both the financial and the technical point of view.

SUMMARY OF THE INVENTION

The present invention is based on the object of alleviating the disadvantages referred to, or at least improving the situation. This aim is attained by way of the appended claims, wherein the claims relate to a mobile radio device, a base station, a transmitter network, a method, a software module, and a server for improving a transmission and/or reception quality.

According to a first aspect of the present invention, a mobile radio device is proposed for communication in a mobile radio network, wherein the mobile radio device is configured such as to operate in a mobile radio network and to communicate by way of mobile radio signals which are allocated to the mobile radio device. The mobile radio device is characterized in that the mobile radio device is further configured such that, as a function of a test result, it amplifies or amplifies mobile radio signals between a base station and at least one further mobile radio device, in order to improve reception quality and/or transmission quality of the mobile radio signals. A number of the foregoing expressions are explained hereinafter for better allocation. The foresaid mobile radio device according to the invention is a mobile communications device, which comprises a battery and/or an accumulator and/or another electrical supply source provided for mobile purposes, such that the mobile radio device can operate flexibly at different locations without needing to be wire-bound in order to be supplied with electrical energy. In addition, the mobile radio device is configured such as to comprise a subscriber identifier, such that, by means of the subscriber identifier, an unmistakable identifier of the mobile radio device in the mobile radio network can be achieved. Such a subscriber identifier is, in particular, provided as SIM (Subscriber Identity Module) or as electronic identifier. The expression "mobile radio network" is understood to mean a network for mobile communication between the different subscribers, wherein the invention, and in particular the mobile radio device according to the invention, are not restricted to the mobile radio network conventionally referred to, but can also put the solution according to the invention into effect in a cross-mobile-radio-network fashion. This means that the mobile radio device is provided such as to communicate in a single certain mobile radio network with other subscribers and/or, in a wider mobile radio network, to achieve an amplification, and therefore an improvement in reception and/or transmission quality. The amplification of the mobile radio signals is carried out as a function of the test result, wherein the test result represents a testing of parameters and/or the result of a manual input, with which the parameters have either been determined beforehand or are determined at a time before a decision is to be taken with regard to an amplification procedure. The test result serves in general to initiate the amplification or to prevent amplifying. The test result is, in particular, the result of a mathematical calculation, making recourse to the predefined parameters and/or inputs, or a comparison operation, which results in a simple triggering of the amplification on the basis of a certain parameter and/or on the basis of a manual input. Hereinafter further parameters will be described in some detail, and thereby the different embodiments of the test result clarified. It is also to be borne in mind that the test result is not necessarily derived or arises at the mobile radio device, but can also be the result of an external stimulus. Accordingly, provision is also made according to the invention that the mobile radio device contains in particular only a signal or initiation signal to carry out the amplification.

According to a further aspect of the present invention, the mobile radio device is characterized in that the test result is derived from a communication between the mobile radio device, the at least one further mobile radio device, the base station, and/or the mobile radio provider. As has already been indicated above, what is meant here is that, for the derivation of the test result, the parameters and/or manual inputs can be exchanged between one another by way of the different mobile radio components, and therefore a communication takes place between the mobile radio components. The mobile radio components are, in particular, the mobile radio device, the further mobile radio device, the base station, or the mobile radio provider.

Preferably, the mobile radio device according to the invention is characterized in that the test result is dependent on at least one parameter, which is allocated to the mobile radio device, the further mobile radio device, the base station, and/or the mobile radio provider. In this situation, different types of parameters are addressed, which for technical reasons are allocated only to one certain component in the mobile radio network, in particular only to the mobile radio device, the further mobile radio device, the base station, and/or to the mobile radio provider. In this connection, the parameter allocated to the mobile radio device and the parameter allocated to the further mobile radio device is, in particular, an item of energy supply information, an accumulator status, an accumulator service life, a reception level, a transmission level, an item of manufacturer information, an operating system identifier, a customer specification, an identifier for the mobile radio provider, a credit points level, an account balance, an approval status, a data volume, a provision time, a utilization time, and/or a user input. The expression "energy supply information" is to be understood to mean in what manner the mobile radio device and/or the further mobile radio device is to be supplied with electrical energy, whether, for example, by way of a power socket, an accumulator pack, by way of the integrated battery or the integrated accumulator, by means of a mobile electrical support, such as, for example, a portable solar cell, or the like, wherein, in this situation, in particular the availability of the electrical energy is important for the mobile radio device which is to be drawn on for the amplification, such that an amplification according to the invention is initialized when the mobile radio device has adequate electrical energy, and/or suitable access to electrical energy. In consequence, the terms accumulator status and accumulator service life are better allocated to the forenamed device. The reception level is important inasmuch as, for amplifying, the mobile radio device must itself have an adequate reception quality, whether it be to a base station or to the further mobile radio device. The manufacturer information can be drawn on in order, for example, to check on compatibility and/or to use the solution according to the invention for only a certain manufacturer, wherein also the operating system identification (iOS, Android or the like) of the mobile radio devices can be drawn on. The customer specification characterizes the specifications of a customer or subscriber in the mobile radio network, or the specifications relating to the customer on the network operator side or with the providers, such that the solution according to the invention is used with the presence of at least one certain customer specification. The identifier of the mobile radio provider can also be used as a parameter for the utilization or provision of the solution according to the invention, such that only certain suppliers or providers use these and/or make them available for their customer group, in order to be availed of a better reception and/or transmission quality. A credit points level or account balance is meant in general to be a points level which rations the provision of the solution according to the invention, such that, on the basis of a credits point level or an account balance, it will be determined as a matter of administration how often or how long a certain mobile radio subscriber provides the solution according to the invention for a further mobile radio device and/or may use the further mobile radio device. Administration on the basis of a credit points level or account balance can be arranged based in particular on a virtual points system or by a conversion to a monetary sum. In a similar manner, the use of the solution according to the invention can be rationed as a function of a data volume (download and/or upload). As approval status, consideration can be given to a manual adjustment setting, wherein this can relate to calendar data, such as location, day, point of time, duration, time window. As utilization time, in a similar manner as referred to heretofore, certain times can be provided for or excluded. The data referred to heretofore can also be predetermined, such that, based on the adjustment setting, a later automatic utilization of the solution according to the invention can be suppressed or initiated. These can, in addition, also be linked to any desired entries in the calendar of a user, in order to facilitate matters for the user of the system or the mobile radio subscriber. The parameters of energy supply information, accumulator status, accumulator service life, reception level, transmission level, an item of manufacturer information, an operating system identifier, a customer specification, an identifier for the mobile radio provider, a credit points level, an account balance, an approval status, a data volume, a provision time, a utilization time, and/or user input serve individually or in any desired combination for the purposes of administration and, in particular, for comparison and the initiation or suppression of the utilization of the solution according to the invention, in particular for the derivation of the test result.

For further preference, the parameter allocated to the base station and the mobile radio provider is an identifier for the mobile radio provider, a reception level, a transmission level, a release information item, a manufacturer information item, an operating system identifier, a customer specification, a credit points level, an account balance, a data volume, a provision time, a contract specification, and/or a utilization time. In this situation it should be mentioned that a utilization/storage for deriving the test result can be implemented locally on the respective mobile radio device or on other components, such as base station, provider/supplier.

For further preference, the mobile radio device is configured such as to transfer the mobile radio signals which are allocated to the at least one further mobile radio device to a third mobile radio device and/or to a WiFi system. In this situation, it is provided according to the invention that, by the involvement of a third mobile radio device, a chain arrangement of a plurality of mobile radio devices is created, and greater distance intervals between a mobile radio device with no reception at all, or poor reception, and a mobile radio device with adequate transmission and/or reception quality can be covered. The second alternative of transferring to a WiFi system serves to provide better supply via an existing WiFi system, such that, by way of the WiFi system, an indoor distribution or indoor supply is achieved if, by way of a mobile radio device with adequate transmission and/or reception quality, the communication to an external base station is implemented, but the transfer to the indoor area takes place by way of the WiFi system.

According to the invention, it is also provided that the mobile radio device is equipped with an application for the administration of an amplification of mobile radio signals. What is meant by this is that the present invention proposes both a complete realisation on the hardware level, as well as a partial realisation with hardware and software components. It is therefore provided that a mobile radio device is provided with a software component as an application which comes into use for the administration of the solution according to the invention.

According to the invention, the mobile radio device is a mobile radio telephone, a laptop, a notebook, a tablet-PC, a smartphone, or a device provided with a subscriber identifier for operation in a mobile radio network. Accordingly, devices according to the invention are brought into use, which are in particular regarded as being in the mobile sector and as being portable, such that a spontaneous amplification of information signals when a certain mobile radio subscriber is not availed of transmission and/or reception, or only of poor quality. In this context capacities are also used which have hitherto remained unused, and can be made flexibly made available with regard to both location and time.

According to the invention, also a base station is proposed which is configured such as to operate or co-operate with a mobile radio device according to the invention, as described here. A base station according to the invention is capable of transferring the necessary parameters and/or certain instructions to the mobile radio devices and/or necessary parameters and/or signals from the mobile radio devices to the respective provider.

Also proposed according to the invention is a transmitter network, consisting of at least one base station, such as described here. As a result of this, the scope of application of the solution according to the invention is broadened.

With a further aspect according to the invention of the present invention, a method is proposed for the amplification of mobile radio signals, characterized in that, as a function of a test result, an amplification of mobile radio signals by a mobile radio device is initialised, wherein the mobile radio signals involve a mobile radio signal between a base station and at least one further mobile radio device, in order to improve reception quality and/or transmission quality of the mobile radio signals at the at least one further mobile radio device.

According to the invention, a method is further proposed which is characterized in that the test result is derived from a communication between the mobile radio device, the at least one further mobile radio device, the base station, and/or the mobile radio provider.

According to the invention, a further method is proposed which is characterized in that the test result is dependent on at least one parameter which is allocated to the mobile radio device, the further mobile radio device, the base station, and/or the mobile radio provider.

According to the invention, a further method is proposed which is characterized in that the parameter allocated to the mobile radio device, and the parameter allocated to the further mobile radio device, is an energy supply information item, an accumulator status, an accumulator service life, a reception level, a transmission level, an item of manufacturer information, an operating system identifier, a customer specification, an identifier for the mobile radio provider, a credit points level, an account balance, an approval status, a data volume, a provision time, a utilization time, and/or a user input.

According to the invention, a further method is proposed which is characterized in that the parameter allocated to the base station and the mobile radio provider is an identifier for the mobile radio provider, a reception level, a transmission level, an approval item of information, a manufacturer item of information, an operating system identifier, a customer specification, a credit points level, an account balance, a data volume, a provision time, a contract specification, and/or a utilization time.

Further proposed according to the invention is a software module or software product for the realisation of one of the devices according to the invention and/or for carrying out one of the methods according to the invention. The software module is configured such as to be stored on a storage medium permanently and/or temporarily. For further preference, the software module is configured in order to be put into operation by means of a computer unit. For further preference, the software module is configured in such a way that it can be put into effect at least partially on a server, a base station, a provider system (server/network) or the like, and provides initiation results for other mobile radio subscribers. It is clear that the software module according to the invention can only be put to use in co-operation with a computer unit and under temporary or permanent storage on an appropriate medium. Software module or software product is to be understood to mean both the source code as well as any desired derivative from the source code, such as, for example, an executable variant of the source code, and is to be understood as synonymous.

Also proposed according to the invention is a server, configured for carrying out one of the methods described herein, in particular for the co-operation with one of the base stations described herein.

For further preference, the mobile radio device and/or the further mobile radio device are configured such as to amplify the information signals only passively, such that the mobile radio device and/or the further mobile radio device do not analyze the information signals received from the air interface. Accordingly, the mobile radio device and/or the further mobile radio device according to the invention are configured such as to receive and amplify an information signal. For further preference, the method according to the invention is conceived such as to receive an information signal and amplify it without further analysis. In this situation a certain frequency range can preferably be adjusted and set for the information signal.

For further preference, the mobile radio device and/or the further mobile radio device and/or the method are conceived such as to carry out an analysis of the information signal in order to carry out a preselection. Preferably, the mobile radio device and/or the further mobile radio device and/or the method are provided such as to amplify the information signal allocated to at least one certain mobile radio subscriber.

For further preference, an application according to the invention is put to use which manages or initiates an amplification of the information signal on the respective mobile radio device on the application plane.

Preferably, it is provided according to the invention that information signals which are present in the air interface are received and amplified, as well as, by way of alternative, an additional step being provided for the deriving of certain information signals which are addressed to certain mobile radio devices, and these being initially derived and amplified. The first amplification variant referred to can be designated as a type of "blind" amplification, since the amplifying mobile radio device does not examine the data in the information signal with regard to its pertaining to a certain mobile radio device, while the second variant can be designated as a type of specific amplifying variant, because the amplifying mobile radio device looks into the data of the information signal and determines at least an allocation to a certain mobile radio device, in order then to carry out an amplification procedure.

BRIEF DESCRIPTION OF THE DRAWINGS

The present invention is additionally described hereinafter on the basis of a number of figures. In this context, attention is drawn to the fact that the appended figures and the figure descriptions relating to them do not represent a restriction to the foregoing description, but serve only as additional clarification. It is in the nature of the present invention that many conceivable embodiments can be derived, but still do not lie outside the scope of protection of the present claims.

DETAILED DESCRIPTION OF THE PREFERRED EMBODIMENTS

Figure 1:
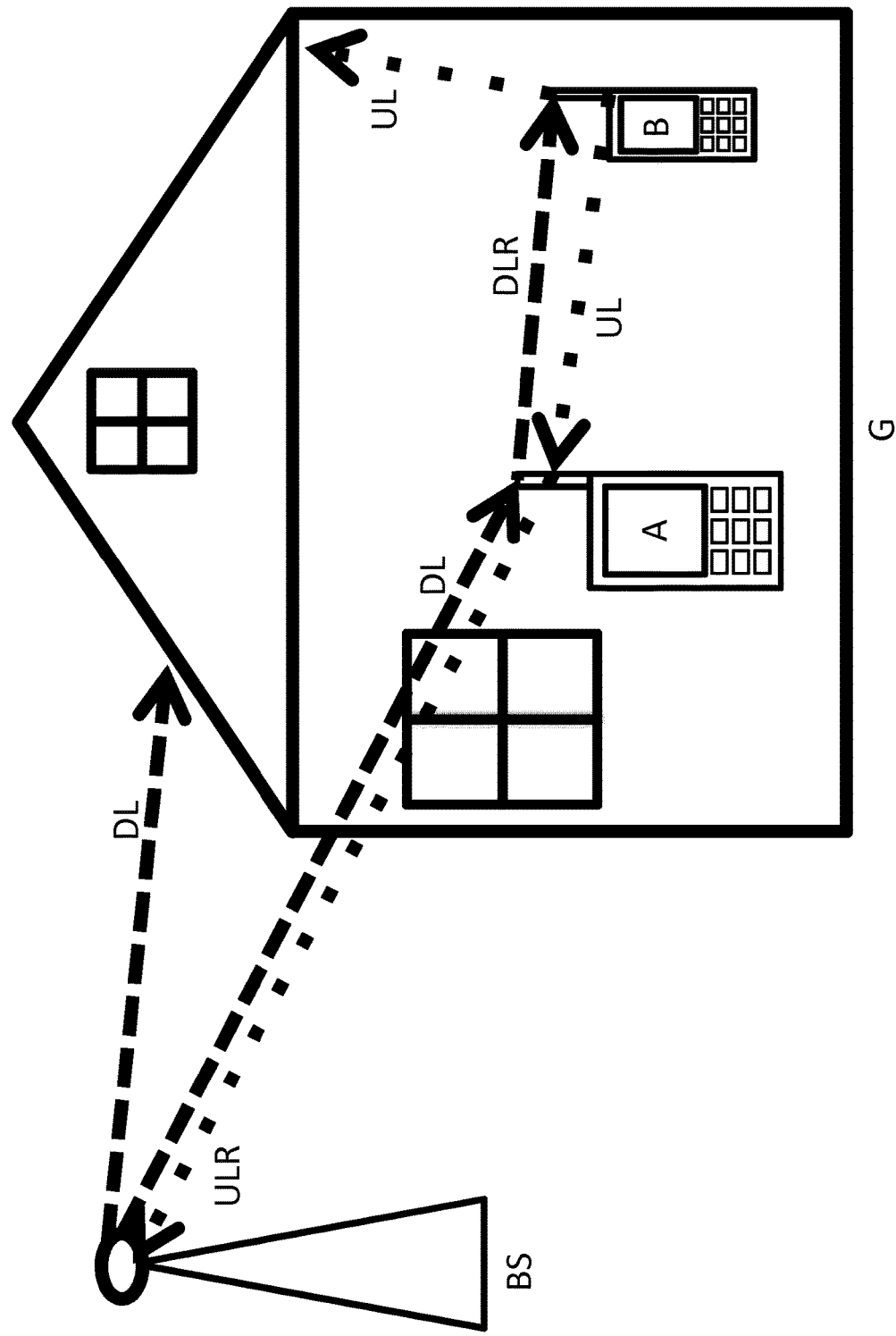
FIG. 1 shows a simplified and idealised spatial information signal distribution in the course of performance of an embodiment according to the present invention.

FIG. 1 shows a base station BS and a building G, wherein a mobile radio device A and a further mobile radio device B are present inside the building G. The base station BS sends a downlink signal DL for the further mobile radio device B, wherein the downlink signal DL, due to screening by the building G, does not reach the further mobile radio device B, or only as a distorted signal. For better discrimination, here the downlink signals are symbolised by broken-line arrows and the uplink signals by dotted-line arrows. The mobile radio device A, however, due to its better positioning, namely at the window of the building G, is capable of receiving the downlink signal DL present in the air interface and of amplifying it, such that the downlink signal DL is then received by the further mobile radio device B, wherein this received downlink signal is symbolised as DLR (R for received). By analogy with the foregoing scenario, the further mobile radio device B transmits an uplink signal UP for the base station BS, wherein the uplink signal UL, due to screening by the building G, is not received by the base station BS, or reaches it as a distorted signal. The mobile radio device A, however, is capable of receiving and amplifying the uplink signal UL present in the air interface, such that the uplink signal UL is then received by the base station BS, wherein this received uplink signal is symbolised as ULR (R for received). At this juncture, attention is drawn to the fact that the representation in FIG. 1 is a substantially simplified representation and, for example, not all the information signals from the mobile radio device A have been represented. Moreover, the information signal UL from the further mobile radio device B to the mobile radio device A is not an information signal which was specifically sent from B to A. but an uplink signal UL, which in the air can be used for A. It is not excluded, however, that an aimed transmission to A can take place.

Figure 2:
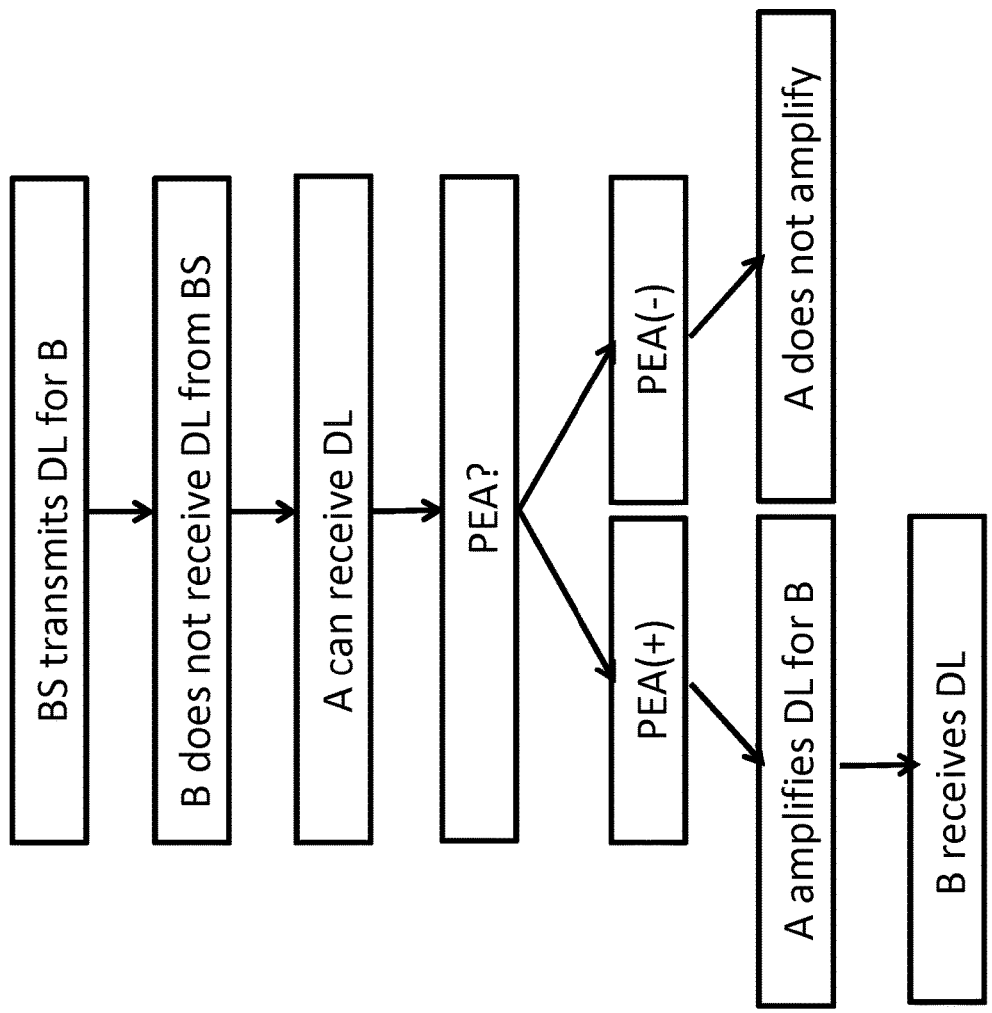
FIG. 2 shows a block diagram for amplifying a downlink signal (DL) according to the present invention.

FIG. 2 shows a block diagram with a number of steps for the amplification according to the invention of a downlink signal DL. In the first step, "BS sends DL for B", the base station BS sends a downlink signal DL to the further mobile radio device B. In the second step, it is shown clearly that B cannot receive the downlink signal DL from BS, or only as a distorted signal. The mobile radio device A, however, also on the basis of FIG. 1, is able to receive the downlink signal DL. In a further step, a test result PE is derived, wherein this involved a test result which is in connection with the mobile radio device A, and is therefore abbreviated as PEA. In consequence, the test result PEA is only determinant for a possible amplifying function of A. If the PEA is positive, an amplification takes place by A, indicated by "A amplifies DL for B". However, if PEA transpires to be negative, then A remains inactive and no amplifying takes place. After an amplification has successfully taken place, B can receive the downlink signal DL.

Figure 3:
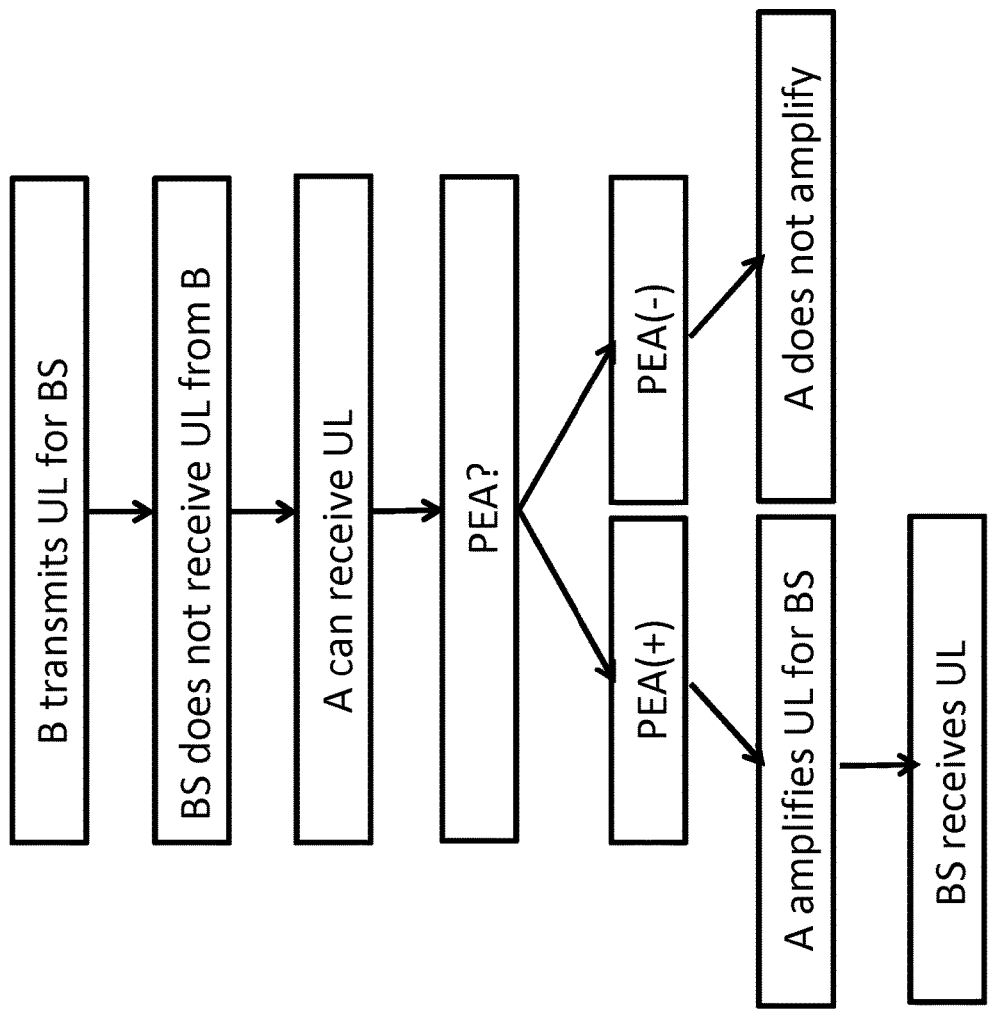
FIG. 3 shows a block diagram for amplifying an uplink signal (UL) according to the present invention.

FIG. 3 shows a block diagram with several steps for the amplification according to the invention of an uplink signal UL. In the first step, "B transmits UL for BS", the further mobile radio device B transmits an uplink signal UL for the base station BS. BS, however, cannot receive the uplink signal UL from B, only a distorted signal. The mobile radio device A, however, is in a position to receive the uplink signal UL. In a further step, a test result PEA, which is determinant for a possible amplifying function of A, is derived. If the result of PEA is positive, an amplification takes place. However, if PEA transpires to be negative, no amplifying by A takes place. After amplifying has been carried out by A, BS can receive the uplink signal UL, which comes from B.

Figure 4:
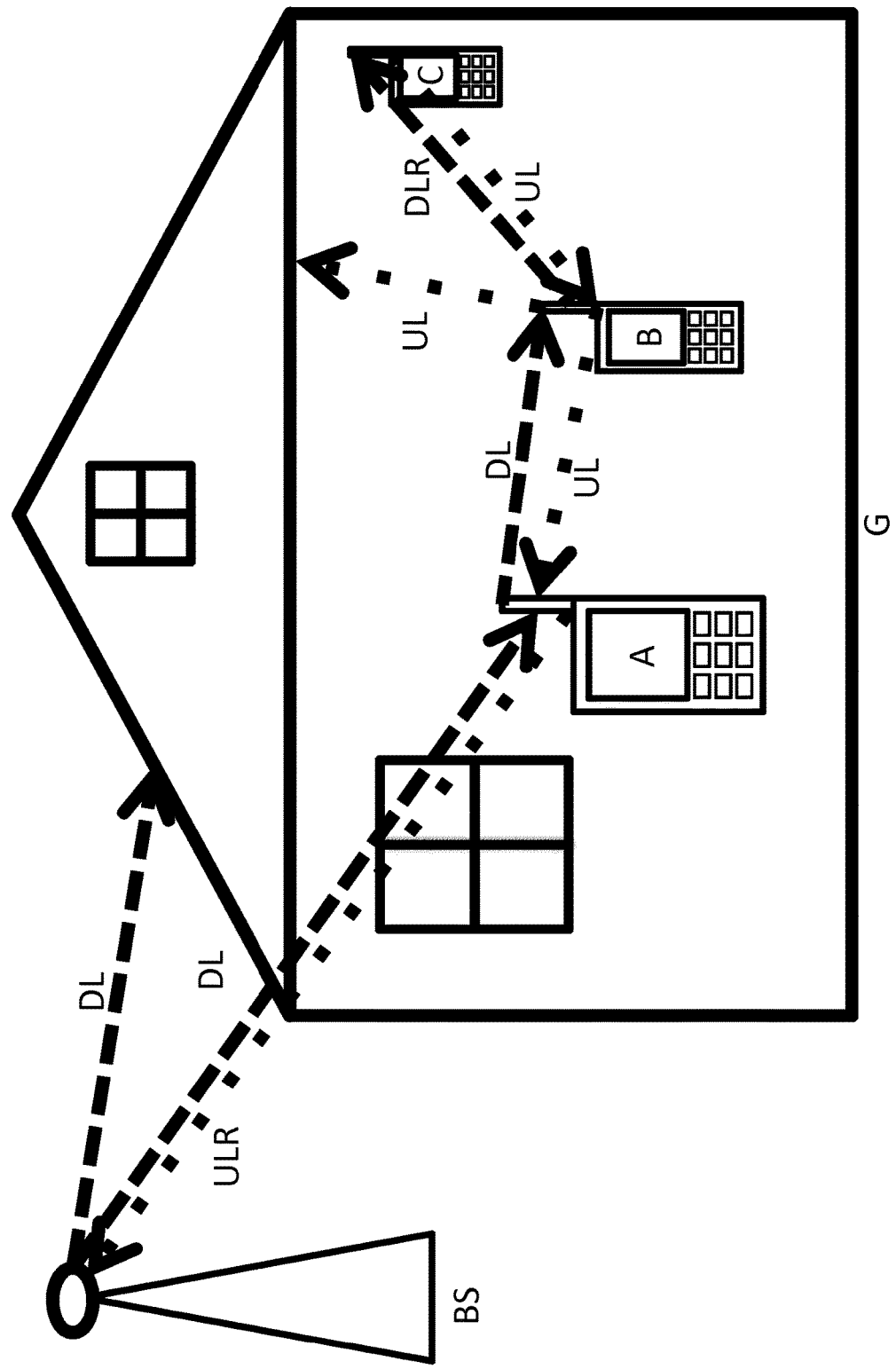
FIG. 4 shows a simplified idealised spatial information signal distribution in the course of performance of a further embodiment according to the present invention, with the participation of a further third mobile radio device.

FIG. 4 shows a base station BS and a building G, wherein a mobile radio device A, a further mobile radio device B and a third mobile radio device C are present inside the building G. The base station BS transmits a downlink signal DL for the third mobile radio device C, wherein the downlink signal DL, due to screening by the building G, does not reach the third mobile radio device C, or as a distorted signal. For better discrimination, the downlink signals are symbolised by broken-line arrows and the uplink signals by dotted-line arrows. The mobile radio device A, however, due to better positioning, namely at the window of the building G, is capable of receiving and amplifying the downlink signal DL present in the air interface, such that the downlink signal DL is then received from the further mobile radio device B, wherein, in this case, the mobile radio device B functions as an intermediate station between the mobile radio device A and the third mobile radio device C, such that the Downlink signal DL, forwarded or amplified twice, is finally received by the third mobile radio device C, and is symbolised as DLR (R for received). By analogy with this, the third mobile radio device C transmits an uplink signal UP for the base station BS, wherein the uplink signal UL, due to a screening by the building G, is not received by the base station BS, or only reaches it as a distorted signal. The mobile radio device B, however, is in a position to receive and amplify the uplink signal UL which is present in the air interface, such that the uplink signal UL can then be received by the mobile radio device A, and is again amplified by A and then received by the base station BS, wherein this received uplink signal is symbolised as ULR (R for received). Accordingly, here a chained amplifying of information signals is taking place, which are exchanged between the base station BS and the third mobile radio device C. According to the invention, not only can the information signals which are present in the air interface be received and amplified, but also an additional step can be carried out for the deriving of certain information signals, which are addressed to certain mobile radio devices and which are initially derived and amplified. The first of the amplification variants referred to can be described as a type of "blind" amplifying, because the amplifying mobile radio device does not examine the data in the information signal for its pertaining to a certain mobile radio device, wherein the second variant referred to can be designated as a type of specific amplifying variant, because the amplifying mobile radio device looks into the data of the information signal and detects and determines at least one pertaining to a certain mobile radio device, in order then to carry out an amplification. At this juncture it is pointed out that the representation in FIG. 4 is also an extremely simplified representation, and, for example, not all the information signals from the mobile radio devices A and B are represented. Moreover, the information signal UL, sent by the third mobile radio device C via the mobile radio device B to the mobile radio device A, is not an information signal, which was specifically send from C via B to A, but rather an uplink signal UL, which is usable for A in the air, such that here a "blind" amplifying variant is represented in FIG. 4. It is of course not excluded that an aimed transmission to A or to A via B can take place, such that a specific amplifying comes into effect.

Figure 5:
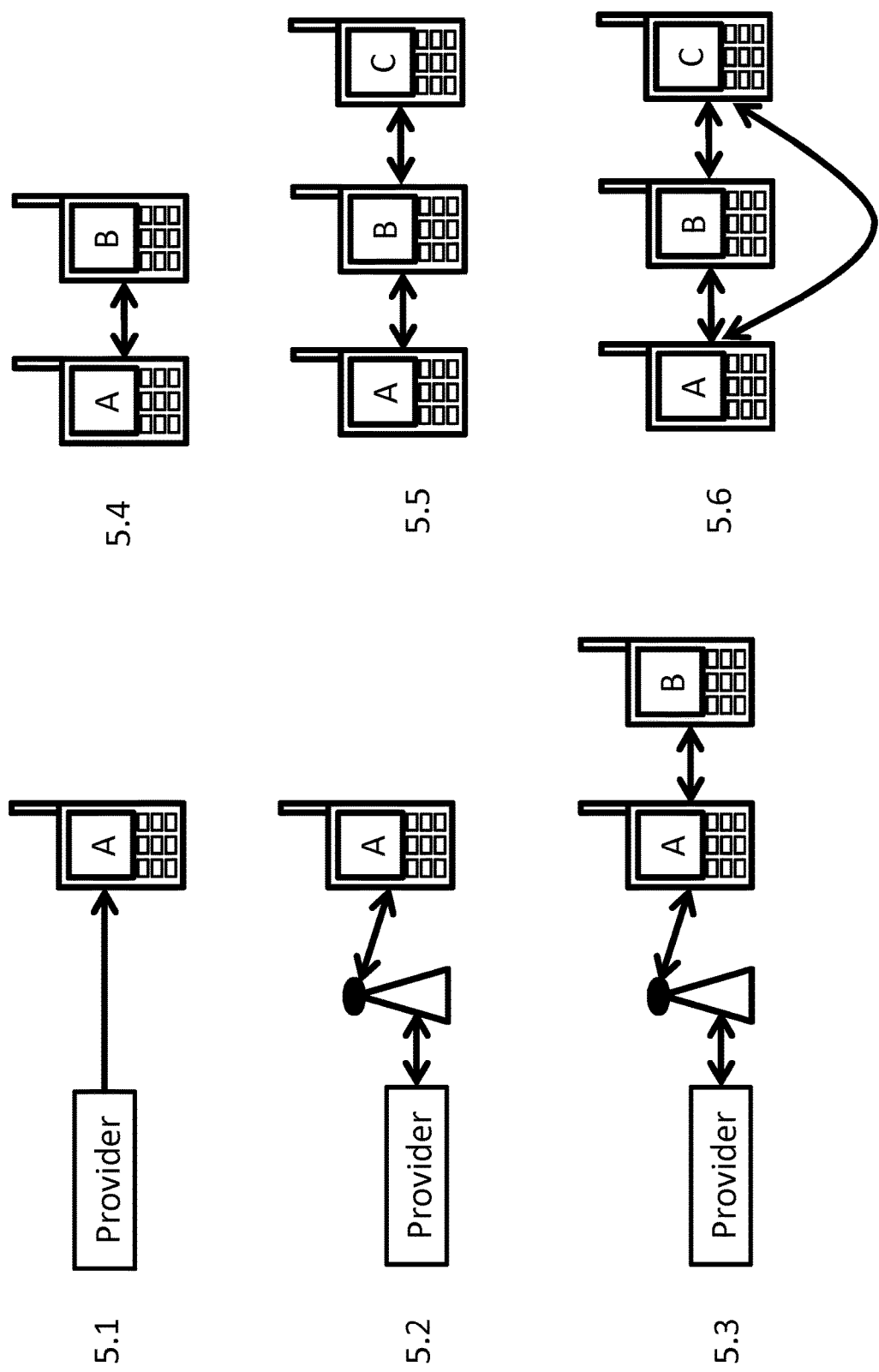
FIG. 5 shows different communications variants for the exchange of parameters and the drawing of test results.

FIG. 5 shows a number of exemplary variants 5.1 to 5.6 for determining or for the exchange of parameters for deriving a test result. 5.1 shows a first variant, with the involvement of a provider and of a mobile radio device A for determining the test result. In this situation, the mobile radio device A and/or the subscriber identification allocated to the mobile radio device A (as SIM card and/or electronic identifier) are provided directly by the provider with an item of information, which determines the behaviour of the mobile radio device A, or, depending on certain circumstances, defines this or programs it in. According to the invention, it is also provided that not only the active amplifying of information signals for other mobile radio devices can be determined, but also a passive utilization of amplified information signals by other mobile radio devices, and therefore determined by a certain determination made or as a function of the parameters referred to here. On the basis of 5.1 in FIG. 5, a direct determination takes place in connection with the amplification behaviour of the mobile radio device A.

The second variant 5.2 in FIG. 5 shows a provider, a base station, and a mobile radio device A. The arrows symbolise the flow direction of parameters, wherein the parameters can be the parameters referred to in the foregoing description, alone or in any desired combination. According to 5.2, the parameters can be exchanged between these three components, wherein the exchange can take place in each case at different times and can lead to different test results, such that a decision can always be made in accordance with the circumstances present at that moment with regard to an amplifying, not amplifying, utilization of an amplification, or non-utilization of an amplification. The determination of the test result can in this situation take place either at the provider, at the base station, or at the mobile radio device A.

In FIG. 5, 5.3 shows the same structure as in 5.2, with an additional mobile radio device B. The arrows show the possibilities for the exchange of parameters, and the individual components can in each case represent the location of the deriving of a test result, such that the test result can be derived at the provider, at the base station, at the mobile radio device A, or at the mobile radio device B, and this leads to an amplifying of information signals at A and/or B. Represented under 5.4 in FIG. 5 is the possibility of exchanging parameters between A and B. Symbolised under 5.5 is a chain arrangement of three mobile radio devices A, B and C, with the corresponding paths for the exchange of parameters and the derivation of test results at A, B or C. Represented under 5.6 is the same structure as under 5.5, with the additional path for the exchange of parameters between the mobile radio device A and the mobile radio device C.

The invention claimed is:

1. A mobile radio device for communication in a mobile radio network:
   wherein the mobile radio device is configured in order to operate in a mobile radio network and to communicate by way of mobile radio signals which are allocated to the mobile radio device, wherein the mobile radio device is further configured to select between amplifying or preventing from amplifying, as a function of a test result, mobile radio signals between a base station and at least one further mobile radio device, in order to improve a reception quality and/or transmission quality of the mobile radio signals, wherein the test result is derived by a communication among the mobile radio device, the at least one further mobile radio device, the base station, and/or a mobile radio provider, wherein the test result is dependent on at least one parameter which is allocated to the mobile radio device, the at least one further mobile radio device, the base station, and/or the mobile radio provider, the at least one parameter comprising an item of energy supply information, an accumulator status, an accumulator service life, a release information item, an item of manufacturer information, an operating system identifier, a customer specification, an identifier for the mobile radio provider, a credit points level, an account balance, an approval status, a data volume, a provision time, a utilization time, and/or a user input, wherein:
   when a downlink communication signal sent from the base station to the at least one further mobile radio device is unable to be received by the at least one further mobile radio device, the mobile radio device is configured to:
      in response to receiving the downlink communication signal from the base station, derive a first test result, indicating whether the mobile radio device is able to amplify the downlink communication signal sent from the base station to the at least one further mobile radio device;
      in response to the first test result, indicating that the mobile radio device is able to amplify the downlink communication signal, amplify the downlink communication signal to generate an amplified downlink communication signal, causing the amplified downlink communication signal to be received by the at least one further mobile radio device; and
   when an uplink communication signal sent from the at least one further mobile radio device to the base station is unable to be received by the base station, the mobile radio device is configured to:
      in response to receiving the uplink communication signal from the at least one further mobile radio device, derive a second test result, indicating whether the mobile radio device is able to amplify the uplink communication signal sent from the at least one further mobile radio device to the base station; and in response to the second test result, indicating that the mobile radio device is able to amplify the uplink communication signal, amplify the uplink communication signal to generate an amplified uplink communication signal, causing the amplified uplink communication signal to be received by the base station.

2. The mobile radio device according to claim 1, wherein the mobile radio device is configured such as to transfer the mobile radio signals, which are allocated to the at least one further mobile radio device, to a third mobile radio device and/or to a WiFi system.

3. The mobile radio device according to claim 1, wherein the mobile radio device is equipped with an application for an administration of an amplification of mobile radio signals.

4. The mobile radio device according to claim 1, wherein the mobile radio device is a mobile radio telephone, a laptop, a notebook, a tablet-PC, a smartphone, or a device provided with a subscriber identifier for operating in a mobile radio network.

5. The mobile radio device according to claim 1, wherein the at least one parameter comprises the item of energy supply information.

6. The mobile radio device according to claim 1, wherein the at least one parameter comprises the accumulator status.

7. The mobile radio device according to claim 1, wherein the at least one parameter comprises the accumulator service life.

8. The mobile radio device according to claim 1, wherein the at least one parameter comprises the release information item.

9. The mobile radio device according to claim 1, wherein the at least one parameter comprises the item of manufacturer information.

10. The mobile radio device according to claim 1, wherein the at least one parameter comprises the operating system identifier.

11. The mobile radio device according to claim 1, wherein the at least one parameter comprises at least one of the customer specification or the user input.

12. The mobile radio device according to claim 1, wherein the at least one parameter comprises the identifier for the mobile radio provider.

13. The mobile radio device according to claim 1, wherein the at least one parameter comprises at least one of the credit points level, the account balance, or the approval status.

14. The mobile radio device according to claim 1, wherein the at least one parameter comprises the data volume.

15. The mobile radio device according to claim 1, wherein the at least one parameter comprises at least one of the provision time or the utilization time.

16. A base station, configured for co-operation with a mobile radio device according to claim 1, wherein the base station is configured in such a way as to allow for the deriving of the test result by way of a communication between the mobile radio device and the base station.

17. A transmitter network comprising at least one base station according to claim 16.

18. A method for amplification of mobile radio signals by means of a mobile radio device comprising:

as a function of a test result, selecting between preventing amplification and initializing amplification of mobile radio signals by means of a mobile radio device, wherein the mobile radio signals are mobile radio signals between a base station and at least one further mobile radio device, in order to improve reception quality and/or transmission quality of the mobile radio signals of the at least one further mobile radio device, wherein the test result is derived by way of a communication among the mobile radio device, the at least one further mobile radio device, the base station, or a mobile radio provider, wherein the test result is dependent on at least one parameter which is allocated to the mobile radio device, the at least one further mobile radio device, the base station, and/or the mobile radio provider, the at least one parameter comprising an item of energy supply information, an accumulator status, an accumulator service life, a release information item, an item of manufacturer information, an operating system identifier, a customer specification, an identifier for the mobile radio provider, a credit points level, an account balance, an approval status, a data volume, a provision time, a utilization time, and/or a user input, when a downlink communication signal sent from the base station to the at least one further mobile radio device is unable to be received by the at least one further mobile radio device, in response to receiving the downlink communication signal from the base station, deriving a first test result, indicating whether the mobile radio device is able to amplify the downlink communication signal sent from the base station to the at least one further mobile radio device; and in response to the first test result, indicating that the mobile radio device is able to amplify the downlink communication signal, amplify the downlink communication signal to generate an amplified downlink communication signal, causing the amplified downlink communication signal to be received by the at least one further mobile radio device; and when an uplink communication signal sent from the at least one further mobile radio device to the base station is unable to be received by the base station, in response to receiving the uplink communication signal from the at least one further mobile radio device, deriving a second test result, indicating whether the mobile radio device is able to amplify the uplink communication signal sent from the at least one further mobile radio device to the base station; and in response to the second test result, indicating that the mobile radio device is able to amplify the uplink communication signal, amplifying the uplink communication signal to generate an amplified uplink communication signal, causing the amplified uplink communication signal to be received by the base station.

19. A software module for carrying out the method according to claim 18.

20. A server configured for carrying out the method according to claim 18.

* * * * *